United States Patent [19]

Baxley

[11] 4,113,889
[45] Sep. 12, 1978

[54] PROCESS FOR MAKING HYDRATED PEANUT PRODUCTS AND PRODUCTS MADE THEREBY

[75] Inventor: James Russell Baxley, Edenton, N.C.

[73] Assignee: Peanut Research & Testing Laboratories, Inc., Edenton, N.C.

[21] Appl. No.: 779,030

[22] Filed: Mar. 18, 1977

Related U.S. Application Data

[63] Continuation of Ser. No. 613,311, Sep. 15, 1975, abandoned.

[51] Int. Cl.$^2$ .............................................. A23L 1/36
[52] U.S. Cl. .................................. 426/509; 426/455; 426/518; 426/632; 426/640
[58] Field of Search ............... 426/632, 464, 482, 463, 426/508, 460, 509, 459, 510, 518, 523, 443, 633, 473, 640, 455; 99/536

[56] References Cited

U.S. PATENT DOCUMENTS

| | | | |
|---|---|---|---|
| 617,266 | 1/1899 | Watson | 426/632 |
| 3,294,549 | 12/1966 | Vix et al. | 426/632 |
| 3,901,983 | 8/1975 | Matsunaga | 426/473 X |

OTHER PUBLICATIONS

Altschul; Processed Plant Protein Foodstuffs; Academic Press Inc. Pub., New York, (1958), p. 221.
Webster's New World Dictionary of the American Language, College Ed., 1972, World Pub. Co., N.Y., p. 1045.

*Primary Examiner*—Kenneth M. Schor
*Attorney, Agent, or Firm*—Morse, Altman, Oates & Bello

[57] ABSTRACT

Shelled peanuts, preferably blanched, are pressed to remove fat from the peanuts and then are cooked in water for a time sufficiently to gelatinize starch and coagulate proteins and also inactivate enzymes while destroying microorganisms. The cooked nuts are then fragmented into particles as by dicing for relatively large particles, or by grinding, for small size particles to make paste or, with drying, to make flour, for example. The particulate product, as a flour, may be used for baking or may be added to water to form milk substitutes. Shredded and diced nuts so treated may be used as food extenders, fillers and the like. The resulting product is of high protein content characterized by a long shelf life and extremely flexible with respect to water content.

1 Claim, No Drawings

PROCESS FOR MAKING HYDRATED PEANUT PRODUCTS AND PRODUCTS MADE THEREBY

This is a continuation of application Ser. No. 613,311 filed on Sept. 15, 1975 and now abandoned.

BACKGROUND OF THE INVENTION

1. Field Of The Invention

This invention relates generally to processes for making hydrated peanut products and more particularly is directed towards a new and improved process for making peanut products in a wide range of peanut-to-water ratios.

2. Description Of The Prior Art

A considerable amount of work has been done with respect to the processing of natural peanuts in different ways in order to achieve various peanut based food products. Peanuts are recognized as an excellent source of nutrition, are relatively low in cost, plentiful and provide the important food components of oil, protein and carbohydrates. One well-known product is that of peanut butter which is produced by shelling, roasting, blanching and then grinding the nuts into a paste.

Other peanut products include peanut flour which is made by grinding nuts into a powder and extracting a substantial amount of oil so that the ground nuts do not agglomerate. This provides a finely ground peanut product that is easy to handle and useful in the production of numerous food products often as a substitute for wheat flour, soy beans or the like.

Whole peanuts have also been produced with a low fat content by pressing and reconstituting the nuts as disclosed in U.S. Pat. No. 3,294,549 entitled "Partially Defatted Nut Meats And Process" by Vix et al. Such nuts are characterized by high protein and low calorie content. These nuts are useful not only as food products in themselves but also may be used as starting material in other products such as flavored nuts of the sort shown in my U.S. Pat. No. 3,645,752 entitled "Method Of Making Stabilized Impregnated Peanuts."

One particular disadvantage of prior art processes, especially with respect to those that are directed towards the production of peanut flour or other particulated peanut products, is that they have relatively little control over the moisture content of the nuts. For example, in the Mitchell U.S. Pat. No. 3,689,287 there is shown a method of producing peanut-water dispersions stabilized by heat wherein the peanuts are first finely ground with or without water and then additional water is required to form a fluid suspension. The suspension is then cooked to thicken and stabilize it. This technique involves a minimum moisture content of the cooked dispersion of about 50% thereby requiring a drying process of the ground nuts or slurry in order to produce a dry flour material. Another disadvantage of previous techniques is that after grinding and adding water, the suspension must be immediately heat-treated to stop the actions of enzymes and microorganisms. Even so, there may be some adverse effect during the short period of solids-water contact before the heat treatment.

Accordingly, it is an object of the present invention to provide a new and improved process for making hydrated peanut products. Another object of this invention is to provide a process for producing a variety of ground peanut products having virtually any desire moisture content. Still another object of this invention is to provide a process for making particulated peanut products having a long shelf life, and a material which may be provided in various conditions of particle size as well as moisture content for a wide range of uses.

SUMMARY OF THE INVENTION

This invention features a method of making hydrated peanut products and the products made by such process, comprising the steps of cooking shelled peanuts in wet heat for a time sufficient to gelatinize starch and coagulate proteins. The cooked nuts are then fragmented to any desired particle size either in the cooking medium or after draining, depending upon the end product whether it be a dry flour or a milk-like substance, for example. The cooking step prior to fragmentation allows full control over the moisture content of the end product which may be finely ground into flour, shredded, or diced, for example.

DETAILED DESCRIPTION OF THE PREFERRED EMBODIMENTS

In the preferred embodiment of the invention, shelled peanuts are first blanched as by use of machines of the sort shown in U.S. Pat. Nos. 3,196,914 and 3,217,764 wherein shelled nuts are passed first through slitters which slit the skin of the nut. The nuts are then dehydrated to cause the skin to curl from the slit prior to being fed onto a blanching machine in which a moving belt carries the nuts in individual streams against diagonally extended abrasive baffles which rub off the nut skin without splitting or breaking the nut. The peanuts' hearts or germs may also be removed from the peanuts by known means in order to avoid the bitter flavors which they contain and which otherwise might detract from the flavor of the finished product.

The blanched nuts are then pressed to remove a substantial amount of their natural oil. The processes for carrying out the pressing operation are disclosed in U.S. Pat. No. 3,294,549 and essentially involve subjecting peanuts, having a 3 to 8% by weight moisture content, to pressing as in a hydraulic press under pressures on the order of 2000 to 5000 p.s.i., for example. This pressing step removes from 20 to 90 weight percent, and preferably 50–55 weight percent, of the oils causing them to become physically distorted. This is done without any appreciable breakage of the nuts and the distorted nuts may be reconstituted to substantially their original size and shape by subjecting them to immersion in water, or other aqueous vehicle. Once reconstituted, the nuts may be dried to provide a partially defatted high protein nut meat.

Blanched, pressed peanuts with 50–55% of the oil removed contain:

38–41% protein
31–34% oil (fat)
16–18% carbohydrates
5–7% moisture
3–4% ash

Thus the calorie content is notably reduced while increasing the protein value.

The pressed peanuts may be used whole, or may be ground into a meal or flour, either raw or roasted. They may also be cooked by boiling in water and processed further by chopping, dicing, slicing, shredding or grinding for unique uses in a variety of food products. These cooked pressed peanuts are especially versatile in that they are quite bland in flavor, and are able to contribute body, texture, and water and fat binding capacity in addition to their nutritive qualities.

Typical analyses for raw and roasted partially defatted peanut meal or flour are as follows:

|                      | RAW    | ROASTED |
|----------------------|--------|---------|
| Moisture             | 6.4%   | 1.5%    |
| Fat (Oil)            | 31.2%  | 32.8%   |
| Protein              | 41.4%  | 43.4%   |
| Crude Fiber          | 2.5%   | 2.8%    |
| Ash                  | 3.5%   | 3.8%    |
| Nitrogen Free Extract| 15.0%  | 15.7%   |
| Protein Solubility   | 98.2%  | 88.2%   |

The partially defatted, high protein, nut meat, in accordance with the present invention, is then cooked by wet heat which may be done either in an open vat of water, in a pressure cooker with water or by steam. In any event, the nuts are cooked in a wet environment for a time sufficient to gelatinize the starch and coagulate the proteins of the nuts to form a tightly bound structure of peanut solids, oil and water, even when finely ground. The cooking treatment further inactivates enzymes and destroys microorganisms that would adversely affect the product quality. Cooking temperatures in the range of 150° to 300° F. may be used and for pressure or steam cooking temperatures above 212° F. are required.

In practice, the cooking time is variable depending upon the temperature and on the desired moisture content of the end product. Thus, the time may range from 5 minutes or less to 1 hour or longer. Preferably, they should be boiled at least for 10 minutes. The use of wet heat, whether water or steam, permits lower temperature treatment than would be possible with dry heat and, further, this procedure inactivates the enzymes.

In the preferred mode of the invention, open vat atmospheric pressure cooking is utilized and, typically, three parts of water by weight, are used for every one part of nuts, by weight. The nuts are boiled for one hour at 212° F. This cooking process results in the nuts absorbing water gradually thereby allowing a very high level of control over the moisture content of the end product. Since the technique provides much better control by selectively varying the cooking time and temperature over the moisture content a much greater variety of form and particle size is possible in the cooked product.

After the cooking treatment, the nuts are then comminuted as by chopping, dicing, slicing, shredding or grinding to a course or fine particle size, as desired. The fragmenting may be done within the cooking water itself by pouring the cooked nuts together with the water through a grinder to procure a nutritious peanut milk, for example. Depending upon the original water-to-nut ratio the end product can be modified by draining or partially draining the nuts and then grinding them into a paste. If a dry end product is desired, the nuts are fully drained after cooking and then comminuted to whatever particle size or shape may be desired. The drained nuts may be ground into a coarse or fine powder to produce peanut flour which is free of agglomerates and is free-flowing thereby being easy to handle for various food purposes such as a partial wheat flour replacement for bakery products.

Since the hydrated nuts would have a higher moisture content than normal, a drying step must be added where a dry end product is desired. Various drying techniques may be used such as spray drying, heat drying or the like. The various peanut particle forms lend themselves to uses in a variety of food products depending upon texture, appearance and function desired. For example, the chopped, sliced or shredded product may be employed as a substitute for coconut, for example, while the paste may be used as high protein thickeners or bases for soups, sauces and gravies as well as in comminuted meat products such as hamburger, sausages, etc.

The finely ground paste may be further processed into a milk product or dried into a staple powder by a variety of drying operations including spray drying, freeze drying, drum drying or the like.

Insofar as the initial cooking steps by means of wet heat has essentially stopped enzyme action and destroyed microorganisms, the end product will have a long shelf life and the cooked nuts may be combined with water in a wide range of ratios or used in a fully dried condition thereby providing very great flexibility in the formation of the end product.

Instead of the partially defatted nut meats as the starting material full fat peanuts may be employed in the initial cooking step using wet heat as the medium for gelatinizing starch and coagulating the proteins of the nuts. The cooked nuts are then comminuted in the same fashion as with the partially defatted nuts with the resulting products being higher in oil content than in the case of the partially defatted nuts.

Set forth below are several examples of recipes which utilize pressed, boiled and ground peanuts processed according to the invention and which demonstrate the versatility of the process.

The peanuts are prepared by boiling raw, pressed (50-55% oil removed) peanuts with 3-4 times their weight of water in an open or partially closed vessel. Select a vessel large enough to contain the considerable foam that will be produced. Do not completely cover the vessel during boiling, or foaming will be excessive. If desired, acceptable antifoam agents may be used. After boiling begins, reduce heat to a slow to medium boil.

Boiling time is variable, depending on the amount of hydration desired. Most recipes give best results when the nuts are fully hydrated, or absorb almost an equal weight of water. This requires a boiling period usually of at least 1 hour. Lesser boiling times produce less water pickup and may be preferred if the nuts are to be shredded to produce a simulated coconut product, for example. In any case, boiling times of at least 10 minutes are desired to destroy microorganisms, inactivate enzymes, coagulate proteins and starches, and eliminate the green raw taste.

After boiling, the nuts are cooled, drained, and then ground, chopped, sliced, diced or shredded as desired. The hydrated peanuts should be kept in closed containers until used to prevent moisture loss and bacterial contamination. If they are not to be used immediately, they should be refrigerated, in which case they may be safely stored for up to 48 hours.

For most recipes, the hydrated peanuts should be ground fairly fine, producing a thick, viscous paste. A food chopper or grinder with a plate containing 3 mm or smaller holes is satisfactory.

The quantities specified in the recipes are for the product after boiling and grinding.

The fully hydrated peanuts, after boiling for about 1 hour, contain approximately 50% moisture, 16% oil and 20% protein.

EXAMPLE 1

| CREAM OF PEANUT SOUP Estimated Protein Content: 8-9% | | |
|---|---|---|
| INGREDIENT: | % | 2,000 GM BATCH, GMS |
| Water | 77.53 | 1550.6 |
| Pressed, Roasted Peanut Meal of Flour | 20.00 | 400.0 |
| Salt | 1.00 | 20.0 |
| Starch, Mira Cleer 300 | 0.75 | 15.0 |
| Celery Salt | 0.33 | 6.6 |
| Onion Powder | 0.33 | 6.6 |
| White Pepper | 0.06 | 1.2 |
| | 100.00 | 2000.0 |

The peanut meal or flour is prepared by roasting pressed (50-55% oil removed) peanuts in an oven or roaster to the desired degree of roast flavor. The roasted peanuts are cooled and ground in a suitable mill to 850 micrometers or finer.

The soup is prepared by mixing all ingredients in the top of a double boiler and heating to 85°-90° C. with frequent stirring until the soup is thickened.

The Mira Cleer 300 starch helps to thicken and prevent separation of the peanut solids. Other starches may be substituted to perform the same function.

For a creamier, more nutritious soup, milk (including soy milk) may be used as a partial or complete replacement of the water. Other seasonings may be used if preferred.

EXAMPLE 2

| CLAM CHOWDER Estimated Protein Content: 8% with peanuts, 4% without peanuts | | |
|---|---|---|
| INGREDIENT | % | 2,000 GM BATCH, GMS |
| Milk | 46.28 | 925.6 |
| Pressed, Boiled Ground Peanuts | 20.00 | 400.0 |
| Clams, Minced or Chopped, Canned | 15.00 | 300.0 |
| Clam Juice or Liquid | 15.00 | 300.0 |
| Starch, Mira Cleer 300 | 2.00 | 40.0 |
| Salt | 1.00 | 20.0 |
| Celery Salt | 0.33 | 6.6 |
| Onion Powder | 0.33 | 6.6 |
| White Pepper | 0.06 | 1.2 |
| | 100.00 | 2000.0 |

Mix the milk and prepared peanuts in top of double boiler until the peanut solids are thoroughly dispersed. Then add the balance of ingredients. Heat to 85°-90° C. with frequent stirring until the soup is thickened. Other starches may be used to replace the Mira-Cleer 300 as a thickening aid. Other substitutuions may be made for the fish, seasonings and milk as desired, using appropriate modifications in percentages.

EXAMPLE 3

| PEANUT SALAD Estimated Protein Content: 14% | | |
|---|---|---|
| INGREDIENT | % | 2,000 GM BATCH, GMS |
| Pressed, Boiled Ground Peanuts | 72.0 | 1440.0 |
| Chopped Pimento Stuffed Olives | 10.0 | 200.0 |
| Chopped Pickles | 4.0 | 80.0 |
| Mayonnaise | 8.0 | 160.0 |
| Prepared Mustard | 3.0 | 60.0 |
| Chopped Onion, Fresh | 2.0 | 40.0 |
| Salt | 1.0 | 20.0 |

-continued

| PEANUT SALAD Estimated Protein Content: 14% | | |
|---|---|---|
| INGREDIENT | % | 2,000 GM BATCH, GMS |
| | 100.0 | 2000.0 |

For the salad, do not grind the peanuts as fine as for soup or chowder. Grinding through a plate with 5mm holes is recommended.

Mix all ingredients and form into a mound in bed of lettuce on a serving dish. Garnish with thin slices of pimento stuffed olives.

EXAMPLE 4

| SALMON CROQUETTES Estimated Protein Content: 18% with peanuts, 18% without peanuts | | |
|---|---|---|
| INGREDIENT | % | 2,000 GM BATCH, GMS |
| Pressed, Boiled, Ground Peanuts | 40.00 | 800.0 |
| Drained, Canned Salmon | 39.0 | 780.0 |
| Salmon Liquid or Juice | 10.0 | 200.0 |
| Fresh Egg | 9.0 | 180.0 |
| Salt | 1.2 | 24.0 |
| Onion Powder | 0.4 | 8.0 |
| Celery Salt | 0.3 | 6.0 |
| White Pepper | 0.1 | 2.0 |
| | 100.0 | 2000.0 |

(Plus extra egg & bread crumbs for breading.)

Grind nuts through plate with 3mm holes or smaller. Mix all ingredients and form into individual croquettes in a cone shape, each croquette weighing 50-60 grams.

Dip in beaten egg and roll in fine dry crumbs. Place on lightly greased pan or baking sheet and bake in oven at 250° C. for about 40 minutes or until lightly browned. Serve with any suitable sauce.

EXAMPLE 5

| POTATO CAKES Estimated Protein Content: 10% with peanuts, 1% without peanuts | | |
|---|---|---|
| INGREDIENT | % | 2,000 GM BATCH, GMS |
| Pressed, Boiled, Ground Peanuts | 47.0 | 940.0 |
| Mashed Potatoes | 47.0 | 940.0 |
| Salt | 2.0 | 40.0 |
| Starch, Mira Cleer 300 | 2.0 | 40.0 |
| Starch, Binasol 81 (pregelatinized) | 2.0 | 40.0 |
| | 100.0 | 2000.0 |

Grind through plate with 3mm holes or smaller.

Peel raw potatoes and cook in boiling water until they are soft and tender. Drain and discard water. Mash or grind the potatoes until as finely ground as the peanuts.

Mix all ingredients and form into round flat cakes about 10mm thick, each cake weighing about 35 grams. Fry quickly in shallow hot oil, turning to brown on both sides. Drain on absorbent paper and serve immediately while hot.

The two starches serve to bind the mixture together and to reduce oil absorption during drying. Other starches may be substituted to perform the same functions.

EXAMPLE 6

BEEF PATTIES

Pressed, boiled, ground peanuts may be added to ground beef in varying proportions, providing less shrinkage and loss of meat juices, a more tender texture, and improved flavor acceptance. Best results are obtained from beef patties containing 25% of the ground cooked pressed peanuts over 100% beef patties.

Grind the peanuts through a plate with 3mm holes or smaller. Prepare patties with each patty weighing about 25 grams, as follows:

WITH 25% PEANUTS 371.25 grams ground beef
123.75 grams pressed, boiled, ground peanuts
5 grams salt Mix ingredients well, and form into patties. If desired, these may be prepared ahead of time and frozen, separating the patties with waxed paper.

Fry the patties on lightly greased grill or skillet.

Since the protein and fat content of the cooked, pressed peanuts is virtually the same as in ground beef, the addition of the peanuts results in no significant chance in protein and fat percentage. Estimated Protein Content: 20%

EXAMPLE 7

PEANUT COOKIES

Estimated Protein Content: 8.5% with peanuts, 5.0% without peanuts.

| INGREDIENT | % | 2,000 GM BATCH, GMS |
|---|---|---|
| Sugar | 34.7 | 694.0 |
| All purpose flour | 25.2 | 504.0 |
| Shortening | 18.0 | 360.0 |
| Pressed, Roasted Peanut Flour | 10.8 | 216.0 |
| Egg, Fresh Whole | 9.0 | 180.0 |
| Vanilla Extract | 1.0 | 20.0 |
| Salt | 0.5 | 10.0 |
| Baking Powder | 0.4 | 8.0 |
| Baking Soda | 0.4 | 8.0 |
|  | 100.0 | 2000.0 |

Thoroughly blend the sugar and shortening. Blend in the egg and vanilla extract. Add the remaining dry ingredients with the flours being added last. Mix well. Form the dough into small balls of about 10 grams each. Place on lightly greased baking sheet, allowing room for spreading. Bake for 15 minutes at 177° C.

This particular recipe uses the peanut flour to replace 30% of the wheat flour. Other proportions may be used, including some soy flour if desired.

EXAMPLE 8

BREAD

Estimated Protein Content: 9% with peanuts, 7% without peanuts

| INGREDIENT | % | 2-LOAF BATCH |
|---|---|---|
| Active Dry Yeast | .49 | 7 grams |
| Water | 4.05 | 58 grams |
| Milk, Scalded | 32.15 | 460 grams |
| Sugar | 1.82 | 26 grams |
| Salt | .91 | 13 grams |
| Shortening | .84 | 12 grams |
| Sifted All-Purpose Flour | 53.73 | 769 grams |
| Peanut Flour | 6.01 | 86 grams |
|  | 100.00 | 1341 grams TOTAL |

Soften yeast in water (38° C.). Combine hot milk, sugar, salt, and shortening. Cool to 30° C.

Stir in ⅓ of the flour; beat well. Add the softened yeast; mix. Add enough of remaining flour to make a moderately stiff dough. Turn out on lightly floured surface; knead till smooth and satiny (8–10 minutes). Shape in a ball; place in lightly greased bowl, turning once to grease surface. Cover; let rise in warm place until double (about 1½ hours). Punch down and let it rise again until double (about 45 minutes).

Cut the dough in two portions. Shape each portion into a smooth ball. Cover and let rest 10 minutes . Then shape it into loaves; place the loaves in two greased loaf pans (22×11×6-cm) and let rise until double (about 1 hour). Bake in hot oven (205° C.) 35 minutes or until done. If tops brown too fast, cover the loaves with aluminum foil during the last 20 minutes.

Having thus described the invention, what I claim and desire to obtain by Letters Patent of the United States is:

1. The method of making comminuted hydrated peanut products, comprising the sequential steps of
    (a) first, mechanically blanching shelled whole peanuts at ambient temperatures and in a dry condition, whereby the skins are fully removed therefrom,
    (b) then, adjusting the moisture content of the blanched nuts to 3 to 8% by weight and pressing the blanched whole nuts under pressure of 2000 to 5000 psig to remove a substantial portion of the fat therefrom without breaking the nuts,
    (c) cooking said whole and partially defatted blanched peanuts in the presence of plain water in a weight ratio of at least 1 part nuts to 3 parts water at a temperature between 150° and 300° F. under pressure when at temperatures above the boiling point for a period of 10 to 60 minutes to gelatinize the starch and coagulate the proteins in said peanuts and hydrate the peanuts to a preselected moisture content whereby the nuts absorb an amount of water substantially equal to the weight of the nuts,
    (d) then, draining the cooked nuts, and,
    (e) then, comminuting the cooked peanuts.

* * * * *